(12) United States Patent
O'Donoghue et al.

(10) Patent No.: US 7,998,653 B2
(45) Date of Patent: Aug. 16, 2011

(54) COATING COMPOSITIONS COMPRISING A LATENT ACTIVATOR FOR MARKING SUBSTRATES

(75) Inventors: Karen O'Donoghue, Epping (GB); Jonathan Campbell, Riehen (CH); Alan Platt, Manchester (GB); John Whitworth, Manchester (GB); Howard Roger Dungworth, Huddersfield (GB); Adolf Käser, Bottmingen (CH)

(73) Assignee: CIBA Corp., Tarrytown, NY (US)

( * ) Notice: Subject to any disclaimer, the term of this patent is extended or adjusted under 35 U.S.C. 154(b) by 274 days.

(21) Appl. No.: 11/991,762

(22) PCT Filed: Sep. 6, 2006

(86) PCT No.: PCT/EP2006/066064
§ 371 (c)(1),
(2), (4) Date: Mar. 4, 2009

(87) PCT Pub. No.: WO2007/031454
PCT Pub. Date: Mar. 22, 2007

(65) Prior Publication Data
US 2009/0220749 A1    Sep. 3, 2009

(30) Foreign Application Priority Data

Sep. 15, 2005 (EP) .................................. 05108480

(51) Int. Cl.
*G03F 7/00* (2006.01)
*G03F 7/004* (2006.01)
*G03F 7/20* (2006.01)
*G03F 7/032* (2006.01)
*G03F 7/028* (2006.01)

(52) U.S. Cl. ......... 430/270.1; 430/7; 430/905; 430/944; 430/945; 430/964

(58) Field of Classification Search ............... 430/270.1, 430/7, 905, 944, 945, 964
See application file for complete search history.

(56) References Cited

U.S. PATENT DOCUMENTS

| | | | | |
|---|---|---|---|---|
| 3,955,987 | A | 5/1976 | Schaar et al. | 106/15 |
| 4,241,144 | A | 12/1980 | Hendy | |
| 5,413,629 | A | 5/1995 | Yasui et al. | 106/21 |
| 5,560,769 | A | 10/1996 | Conner et al. | 106/19 |
| 5,897,938 | A * | 4/1999 | Shinmoto et al. | 428/354 |
| 6,057,380 | A | 5/2000 | Birbaum et al. | |
| 6,210,472 | B1 * | 4/2001 | Kwan et al. | 106/31.14 |
| 7,144,676 | B2 * | 12/2006 | Barr et al. | 430/270.1 |
| 2007/0054220 | A1 | 3/2007 | Heneghan | 430/280.1 |

FOREIGN PATENT DOCUMENTS

| | | |
|---|---|---|
| CA | 2042858 A1 | 11/1991 |
| EP | 458502 A2 | 11/1991 |
| EP | 0 600 441 | 6/1994 |
| EP | 600441 A1 * | 6/1994 |
| WO | 96/23659 | 8/1996 |
| WO | 00/61377 | 10/2000 |
| WO | 02/100914 | 12/2002 |

* cited by examiner

*Primary Examiner* — Amanda C. Walke
(74) *Attorney, Agent, or Firm* — Stoel Rives LLP

(57) ABSTRACT

The present invention provides a composition, which comprises a latent activator. It also provides a process for the preparation of these compositions, substrates coated with these compositions and a process for their preparation, a process for preparing marked substrates using these compositions and marked substrates obtainable by the latter process.

15 Claims, No Drawings

COATING COMPOSITIONS COMPRISING A LATENT ACTIVATOR FOR MARKING SUBSTRATES

The present invention refers to a coating composition for marking substrates, to a process for the preparation of these compositions, to substrates coated with these compositions and to a process for their preparation, to a process for preparing marked substrates using these compositions, and to marked substrates obtainable by the latter process.

Packaging usually needs to be marked with information such as logos, bar codes, expiry dates or batch numbers. One way to achieve this is by coating the packaging with a composition, which upon treatment with energy such as heat forms a visible marking. When using laser irradiation as energy, the marking can be even so small that it is invisible or nearly invisible to the human eye.

WO 02/068205 describes a method for marking an object, wherein the object comprises or is coated with a formulation comprising a material having functional groups such as polyhydroxy compounds, and a metal compound such as alkali metal, alkaline earth metal, iron oxides or salts and organometallics. The two components react on irradiation with a laser to form a product of contrasting colour.

The aqueous-based compositions of WO 02/068205 have the disadvantage that they only provide yellow or grey/green markings, but no black markings. Black markings are only obtained using organic solvent-based systems. In addition, the described compositions are not suitable for coating paper or plastics.

It is an object of the present invention to provide coating compositions suitable for coating paper, which yield dark markings of high contrast on exposure to energy.

These objects are solved by the coating composition according to claim 1, the processes according to claims 11, 13 and 14, and the substrates according to claims 12 and 17.

The composition of the present invention comprises a latent activator.

The latent activator can be either a salt of an acid and an amine, or an acid derivative.

The acid can be inorganic or organic. Examples of inorganic acids are sulfuric acid, fluorosulfuric acid, chlorosulfuric acid, nitrosylsulfuric acid, thiosulfuric acid, sulfamic acid, sulfurous acid, formamidinesulfinic acid, nitric acid, phosphoric acid, thiophosphoric acid, fluorophosphoric acid, hexafluorophosphoric acid, polyphosphoric acid, phosphorous acid, hydrochloric acid, chloric acid, perchloric acid, hydrobromic acid, hydriodic acid and hydrofluoric acid. Examples of organic acids are sulfur-based organic acids such as 4-styrenesulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrene-sulfonic acid-co-maleic acid), phosphor-based organic acids such as phenyl phosphonic acid, methane phosphonic acid, phenyl phosphinic acid, 2-aminoethyl dihydrogenphosphate, phytic acid, 2-phospho-L-ascorbic acid, glycero dihydrogenphosphate, diethylenetriamine penta(methylenephosphonic acid) (DTPMP), hexamethylenediamine tetra(methylenephosphonic acid) (HDTMP), nitrilotris(methylene phosphonic acid) and 1-hydroxyethylidene diphosphonic acid, and carboxylic acids such as tartaric acid, dichloroacetic acid, trichloroacetic acid, oxalic acid and maleic acid.

Preferably, the acid is selected from the group consisting of inorganic acids, sulfur-based organic acids, phosphor-based organic acids, carboxylic acids and mixtures thereof. More preferably, the acid is selected from the group consisting of sulfuric acid, thiosulfuric acid, sulfurous acid, phosphoric acid, polyphosphoric acid, phosphorous acid, hydrochloric acid, sulfur-based organic acids, phosphor-based organic acids, carboxylic acids and mixtures thereof. In one most preferred embodiment, the acid is selected from the group consisting of sulfuric acid, hydrochloric acid, sulfur-based organic polyacids and mixtures thereof. In another most preferred embodiment, the acid is selected from phosphoric acid, polyphosphoric acid, and organic phosphoric acids and mixtures thereof.

Examples of sulfur-based organic polyacids are poly(4-styrene sulfonic acid) and copolymers comprising 4-styrene sulfonic acid units such as poly(4-styrenesulfonic acid-co-maleic acid). Examples of organic phosphoric acids are 2-aminoethyl dihydrogenphosphate, phytic acid, 2-phospho-L-ascorbic acid, glycero dihydrogenphosphate, diethylenetriamine penta-(methylenephosphonic acid) (DTPMP) and hexamethylenediamine tetra(methylene-phosphonic acid) (HDTMP).

The amine can be of formula $NR^1R^2R^3$, wherein $R^1$, $R^2$ and $R^3$ can be the same or different and are hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, or $R^1$ is hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl and $R^2$ and $R^3$, together with the nitrogen of the amine of formula $NR^1R^2R^3$ form a 5- to 7-membered ring, whereby $C_{1-30}$-alkyl, $C_{2-30}$-alkenyl, $C_{4-8}$-cycloalkyl, $C_{5-8}$-cycloalkenyl, aralkyl and aralkenyl can be unsubstituted or substituted with $NR^4R^5R^6$, imino, cyano, cyanamino, hydroxy and/or $C_{1-6}$-alkoxy, and aryl can be unsubstituted or substituted with $NR^4R^5R^6$, cyano, cyanamino, hydroxyl, $C_{1-6}$-alkyl, and/or $C_{1-4}$-alkoxy, wherein $R^4$, $R^5$ and $R^6$ can be the same or different and are hydrogen, $C_{1-6}$-alkyl, $C_{4-8}$-cycloalkyl or aryl.

Examples of $C_{1-30}$-alkyl are methyl, ethyl, propyl, isopropyl, butyl, sec-butyl, isobutyl, tert-butyl, pentyl, hexyl, heptyl, octyl, nonyl, decyl, undecyl, dodecyl, myristyl, palmityl, stearyl and arachinyl. Examples of $C_{2-30}$-alkenyl are vinyl, allyl, linolenyl, docosahexaenoyl, eicosapentaenoyl, linoleyl, arachidonyl and oleyl. Examples of $C_{4-8}$-cyclalkyl are cyclopentyl and cyclohexyl. An example of $C_{5-8}$-cycloalkenyl is cyclohexenyl. Examples of aralkyl are benzyl and 2-phenylethyl. Examples of aryl are phenyl, 1,3,5-triazinyl or naphthyl. Examples of $C_{1-6}$-alkyl are methyl, ethyl, propyl, isopropyl, butyl, sec-butyl, isobutyl, tert-butyl, pentyl, and hexyl. Examples of $C_{1-4}$-alkoxy are methoxy, ethoxy, propoxy, isopropoxy and butoxy.

Preferred $C_{1-30}$-alkyls are $C_{1-10}$-alkyl, more preferred $C_{1-30}$-alkyls are $C_{1-6}$-alkyl. Preferred $C_{2-30}$-alkenyls are $C_{2-10}$-alkyenyl, more preferred $C_{2-6}$-alkenyl. Examples of $C_{1-6}$-alkyl are given above. Examples of $C_{1-10}$-alkyl are methyl, ethyl, propyl, isopropyl, butyl, sec-butyl, isobutyl, tert-butyl, pentyl, hexyl, heptyl, octyl, nonyl and decyl. Examples of $C_{2-10}$-alkenyl and $C_{2-6}$-alkenyl are vinyl and allyl.

Examples of amines of formula $NR^1R^2R^3$ are ammonia, tris(hydroxymethyl)aminomethane, guanidine, methylamine, ethylamine, propylamine, butylamine, diethylamine, ethylene diamine, 1,2-diaminopropane, ethanolamine, triethanolamine, cyclohexylamine, aniline, melamine, methylolmelamine, pyrrole, morpholine, pyrrolidine and piperidine.

Preferably, the amine is of formula $NR^1R^2R^3$, wherein $R^1$ is hydrogen and $R^2$ and $R^3$ are as defined above.

More preferably, the amine is of formula $NR^1R^2R^3$, wherein $R^1$ and $R^2$ are hydrogen and $R^3$ is as defined above.

Most preferably, the amine is ammonia.

Acid derivatives can be esters, amides, anhydrides and thioesters of an acid as defined above, wherein all acidic OH-groups are substituted with $OR^7$, $NR^8R^9$, $OC(O)R^{10}$ or $SR^{11}$, wherein $R^7$, $R^8$, $R^9$, $R^{10}$ and $R^{11}$ can be the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, whereby $C_{1-30}$-alkyl, $C_{2-30}$-alkenyl, $C_{4-8}$-cycloalkyl, $C_{5-8}$-cycloalkenyl, aralkyl and aralkenyl can be unsubstituted or substituted with $NR^{12}R^{13}R^{14}$, halogen, cyano, hydroxy and/or $C_{1-6}$-alkoxy, and aryl can be unsubstituted or substituted with $NR^{12}R^{13}R^{14}$, halogen, cyano, hydroxyl, $C_{1-6}$-alkyl, and/or $C_{1-6}$-alkoxy, whereby $R^{12}$, $R^{13}$ and $R^{14}$ can be the same or different and are hydrogen, $C_{1-6}$-alkyl, $C_{4-8}$-cycloalkyl or aryl, provided that $R^7$ is not hydrogen.

Examples of halogens are chlorine and bromine.

Examples of acid derivatives are ethyl p-toluenesulfonic acid ester, cyclohexyl p-toluene-sulfonic acid ester, dimethyl hydrogen phosphonate, dimethyl methyl phosphonate and trimethylphosphate.

Preferred acid derivatives are esters of an acid as defined above, wherein all acidic OH-groups are substituted with $OR^7$.

Preferably, the latent activator is a salt of an acid and an amine.

Preferably, the composition also comprises a solvent. The solvent can be water, an organic solvent, a liquid monomer or mixtures thereof. Preferably, the solvent is water, an organic solvent or mixtures thereof.

Examples of organic solvents are $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, N-methylpyrolidone and sulfolane, whereby $C_{1-4}$-alkanols and $C_{2-4}$-polyols may be substituted with $C_{1-4}$-alkoxy. Examples of $C_{1-4}$-alkanols are methanol, ethanol, propanol, isopropanol or butanol, isobutanol, sec-butanol and tert-butanol. Examples of a $C_{1-4}$-alkoxy-derivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

More preferably, the solvent is water or a mixture of water and an organic solvent.

Preferably, the organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy.

Preferably, the ratio of water/organic solvent of the mixture of water and organic solvent is at least 0.5/1, and more preferably, at least 1/1.

Most preferably, the solvent is water.

Preferably, the composition of the present invention also comprises a polymeric binder.

Examples of polymeric binders are acrylic polymers, styrene polymers and hydrogenated products thereof, vinyl polymers and derivatives thereof, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders. It also can be a mixture of liquid monomers and a suitable photoinitiator that forms one of the above listed polymeric binders under UV irradiation after coating. In this case, the monomers function as the solvent.

Acrylic polymers are polymers formed from at least one acrylic monomer or from at least one acrylic monomer and at least one other ethylenically unsaturated polymer such as a styrene monomer, vinyl monomer, olefin monomer or maleic monomer.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth) acrylate, substituted $C_{1-6}$-alkyl (meth)acrylates such as glycidyl methacrylate and acetoacetoxyethyl methacrylate, di($C_{1-4}$-alkylamino)$C_{1-6}$-alkyl (meth)acrylates such as dimethylaminoethyl acrylate or diethylaminoethyl acrylate, amides formed from $C_{1-6}$-alkylamines, substituted $C_{1-6}$-alkyl-amines such as 2-amino-2-methyl-1-propane sulfonic acid, ammonium salt, or di($C_{1-4}$-alkyl-amino)$C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide.

Examples of acrylic polymers are poly(methyl methacrylate) and poly(butyl methacrylate), as well as carboxylated acrylic copolymers as sold for example by Ciba under the tradenames Ciba® Glascol® LE15, LS20 and LS24, styrene acrylic copolymers as sold for example by Ciba under the tradenames Ciba® Glascol® LS26 and Ciba® Glascol® C44, and polyacrylic acid polymers as sold for example by Ciba under the tradename Ciba® Glascol® E11.

Styrene polymers are polymers formed from at least one styrene monomer and at least one vinyl monomer, olefin monomer and/or maleic monomer. Examples of styrene polymers are styrene butadiene styrene block polymers, styrene ethylene butadiene block polymers, styrene ethylene propylene styrene block polymers and styrene-maleic anhydride copolymers.

Vinyl polymers are polymers formed from at least one vinyl monomer or from at least one vinyl monomer and at least one olefin monomer or maleic monomer. Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Polyolefins are polymers formed from at least one olefin monomer or from at least one olefin monomer or maleic monomer. Examples of polyolefines are polyethylene, polypropylene, polybutadiene and isopropylene-maleic anhydride copolymer Aldehyde polymers are polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide.

An example of an aldehyde polymer is polyvinyl butyral formed from butyral and polyvinylalcohol.

Epoxide polymers are polymers formed from at least one epoxide monomer and at least one alcohol monomer and/or amine monomer. Examples of epoxide monomers are epichlorhydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides are polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are poyhexamethylene adipamide and polycaprolactam.

Polyesters polymers formed from at least one monomer having an hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Polyurethane are polymers formed from at least one diisocyanate monomer and at least one polyol monomer and/or polyamine monomer. Examples of diisocyanate monomers are hexamethylene diisocyanate, toluene diisiocyanate and diphenylmethane diiscocyanate.

Examples of sulfone-based polymers are polyarylsulfone, polyethersulfone, polyphenyl-sulfone and polysulfone. Polysulfone is a polymer formed from 4,4-dichlorodiphenyl sulfone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The polymeric binders are known in the art and can be produced by known methods, e.g. by polymerisation starting from suitable monomers.

Preferably, the polymeric binder is selected from the group consisting of acrylic polymers, styrene polymers, vinyl polymers and derivatives thereof, polyolefins, polyurethanes and natural polymers and derivatives thereof.

More preferably, the polymeric binder is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, caesin, oxidised starch, starch-vinyl acetate graft copolymers, hydroxyethyl cellulose, methyl cellulose, ethyl cellulose, carboxymethyl cellulose and acetyl cellulose.

Most preferably, the polymeric binder is polyvinyl alcohol or an acrylic polymer as sold for example by Ciba under the tradename Ciba® Glascol® such as Ciba® Glascol® LE15, LS26, E11 or C44. Ciba® Glascol® LS 26 is a core shell polymer consisting of 70 weight parts 55/45 (w/w) styrene/2-ethylhexyl acrylate copolymer, which functions as the core polymer, and 30 weight parts of styrene/acrylic acid copolymer, which functions as the shell polymer.

Preferably the composition of the present invention also comprises a char forming compound. A char forming compound is a compound which forms char upon energy treatment. Generally, a char forming compound is of high carbon and oxygen content.

Examples of char forming compounds are carbohydrates such as monosaccharides, disaccharides and polysaccharides, and derivatives thereof wherein the carbonyl group has been reduced to a hydroxyl group, so-called sugar alcohols.

Examples of monosaccharides are glucose, mannose, galactose, arabinose, fructose, ribose, erythrose and xylose. Examples of disaccharides are maltose, cellobiose, lactose and saccharose. Examples of polysaccharides are cellulose, starch, gum arabic, dextrin and cyclodextrin. Examples of sugar alcohols are meso-erythritol, sorbitol, mannitol and pentaerythritol.

Preferred char forming compounds are monosaccharides and disaccharides. More preferred char forming compounds are saccharose and galactose. The most preferred char forming compound is saccharose.

Preferably, the composition of the present invention can also comprise additional components.

The additional components that may be included in the coating composition can be any component suitable for improving the performance of the composition. The additional component can be a component that can absorb the incident energy and transfer this energy to the system thermally or otherwise such as UV absorber or IR absorber. Examples of other types of additional components are pigments, bases, stabilizers, antioxidants, rheology modifiers, wetting agents, biocides, smoke suppressants and taggants. Taggants are various substances added to a product to indicate its source of manufacture.

Preferably, the coating composition does not contain a dye or colour former.

An example of a UV absorber is 2-hydroxy-4-methoxy-benzophenone.

IR absorbers can be organic or inorganic. Examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2.

Examples of inorganic IR absorbers are oxides, hydroxides, sulfides, sulfates and phosphates of metals such as copper, bismuth, iron, nickel, tin, zinc, manganese, zirconium and antimony, including antimony(V) oxide doped mica and tin(IV) oxide doped mica, Pigments can be added as inorganic IR absorbers, for enhanced contrast between unimaged and imaged areas or as a security feature.

Examples of pigments which function as inorganic IR absorbers are kaolin, calcined kaolin, mica, aluminum oxide, aluminum hydroxide, aluminum silicates, talc, amorphous silica and colloidal silicon dioxide.

Examples of pigments which can be added for enhanced contrast between unimaged and imaged area are titan dioxide, calcium carbonate, barium sulfate, polystyrene resin, urea-formaldehyde resin, hollow plastic pigment.

Examples of pigments which can be added as a security feature are fluorescent pigments or magnetic pigments.

Bases can be added in order to adjust the pH of the composition. Suitable bases are alkali and earth alkaline metal hydroxides, or amines of formula $NR^1R^2R^3$, wherein $R^1$, $R^2$ and $R^3$ are as defined above. Examples of alkali hydroxides are sodium hydroxide and potassium hydroxide.

Examples of rheology modifiers are xanthan gum, methylcellulose, hydroxypropyl methyl-cellulose, or acrylic polymers such as sold under the tradenames Ciba® Rheovis® 112, Ciba® Rheovis® 132 and Ciba® Rheovis® 152.

An example of a wetting agent is Ciba® Irgaclear® D, a sorbitol based clarifying agent, Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which includes a mixture of 1,2-dibromo-2,4-dicyanobutane and 2-bromo-2-nitro-1,3-propandiol and Metasol®TK 100, which includes 2-(4-thiazolyl)-benzimidazole.

An example of a smoke suppressant is ammonium octamolybdate.

The coatings formed by the coating compositions of the present invention can be coated with a laminate layer or overprint varnish. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

The composition of the present invention can comprise 1 to 50%, preferably 1 to 40%, more preferably, 1 to 30%, most preferably 5 to 25% by weight of the latent activator based on the weight of the total composition.

The composition of the present invention can comprise 10 to 95%, preferably 10 to 90%, and more preferably 10 to 80% by weight of the solvent based on the weight of the total composition.

The composition of the present invention can comprise 1 to 80%, preferably 1 to 70%, more preferably 1 to 60% and most preferably 1 to 50%, by dry weight of the polymeric binder based on the weight of the total composition.

The composition of the present invention can comprise 0 to 50%, preferably 0 to 40%, more preferably 1 to 30% and most preferably 1 to 20%, by weight of the char forming compound based on the weight of the total composition.

The composition of the present invention can comprise 0 to 30%, preferably 0 to 20%, more preferably 0 to 10% by weight of additional components based on the weight of the total composition.

The composition of the present invention can consist of 1 to 50% by weight of the latent activator, 10 to 95% by weight of the solvent, 1 to 80% by weight of the polymeric binder, 0 to 50% by weight of the char forming compound and 0 to 30% by weight of additional components, all based on the weight of the total composition.

Preferably, the composition of the present invention can consist of 1 to 40% by weight of the latent activator, 10 to 90% by weight of the solvent, 1 to 70% by weight of the polymeric binder, 0 to 40% by weight of the char forming compound and 0 to 20% by weight of additional components, all based on the weight of the total composition.

More preferably, the composition of the present invention can consist of 1 to 30% by weight of the latent activator, 10 to 80% by weight of the solvent, 1 to 60% by weight of the polymeric binder, 1 to 30% by weight of the char forming compound and 0 to 10% by weight of additional components, all based on the weight of the total composition.

Most preferably, the composition of the present invention can consist of 5 to 25% by weight of the latent activator, 10 to 80% by weight of the solvent, 1 to 50% by weight of the polymeric binder, 1 to 20% by weight of the char forming compound and 0 to 10% by weight of additional components, all based on the weight of the total composition.

Also part of the invention is a process for preparing the composition of the present invention which process comprises mixing a latent activator and a solvent.

If the latent activator is a salt of an acid and amine, the latent activator can also be formed in situ by mixing the acid and the amine.

Preferably, the process comprises mixing a latent activator, a solvent and a polymeric binder.

More preferably, the process comprises mixing a latent activator, a solvent, a polymeric binder and a char forming compound.

Also part of the invention is a substrate coated with the coating composition of the present invention.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. The substrate can also be a pharmaceutical tablet or foodstuff. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

If the substrate does not absorb IR irradiation, for example if the substrate is polyester film, it can be advisable to include an IR absorber or a pigment that acts as an IR absorber into the coating composition.

The thickness of the coating usually chosen is in the range of 0.1 to 1000 µm. Preferably, it is in the range of 1 to 500 µm. More preferably, it is in the range of 1 to 200 µm. Most preferably, it is in the range of 1-20 µm.

Another aspect of the present invention is a process for preparing a coated substrate, which comprises the step of coating a substrate with the composition of the present invention.

The substrate can be coated with the composition of the present invention by using a standard coating application as such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The coating composition can be dried, for example at ambient or elevated temperature. The elevated temperature is ideally chosen to avoid image formation before exposure to the energy.

Also part of the invention is a process for preparing a marked substrate, which comprises the steps of i) coating a substrate with the composition of the present invention, and ii) exposing those parts of the coated substrate, where a marking is intended, to energy in order to generate a marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV, visible or IR laser. Examples of IR lasers are $CO_2$ lasers, Nd:YAG lasers and IR semiconductor lasers.

Preferably, the energy is IR irradiation. More preferably, the energy is IR irradiation having a wavelength in the range of 780 to 1,000,000 nm. Even more preferably, the energy is IR irradiation generated by a $CO_2$ laser or a Nd:YAG laser. Most preferably, the energy is IR irradiation generated by a $CO_2$ laser having a wavelength of 10,600 nm.

Typically the exact power of the IR laser and the line speed is determined by the application and chosen to be sufficient to generate the image, for example, when the wavelength of the IR laser is 10,600 nm and the diameter of the laser beam is 0.35 mm, the power is typically 0.5 to 4 W, and the line speed is typically 300 to 1,000 mm/s.

Yet another aspect of the invention is the marked substrate, which is obtained by above process.

The coating composition of the present invention has the advantage that it is suitable for coating paper and that even aqueous based compositions yield dark markings of high contrast on exposure to energy. In addition, the markings are of high durability and good lightfastness and in case of aqueous-based compositions only include non-hazardous compounds and thus are suitable for food and drug applications. In case semi-transparent coatings are formed, these do not affect the shade or appearance of coloured paper as substrate.

EXAMPLES

Example 1A

Preparation of Ciba® Glascol® LS26

Butyl acetate (250 g) is charged to a reactor and heated to reflux (125° C.). tert-Butyl per-benzoate (7.8 g) is added to the reactor. A monomer feed consisting of styrene (162.5 g) and glacial acrylic acid (87.5 g) is prepared. An initiator feed consisting of tert-butyl-perbenzoate (23.4 g) is prepared. The monomer feed is added to the reactor within 5 hours and the initiator feed is added to the reactor within 5.5 hours. Once the feeds are completed, the reaction mixture is held for a further 1 hour at 125° C. A mixture of 20% by weight aqueous ammonia (100 g) and water (700 g) is added to the reactor whilst distilling off butyl acetate. The distillate is split and the water returned to the reactor and the butyl acetate to the receiver. The temperature of the reaction mixture falls to 93° C. during distillation and rises to 100° C. when all the butyl acetate has been removed. When distillation is complete, the reaction mixture is cooled to below 40° C., the obtained solution of 65/35 (w/w) styrene/acrylic acid, ammonium salt is adjusted to 25% by weight solid content and pH 9.0.

The 25% by weight aqueous solution of styrene/acrylic acid, ammonium salt copolymer (576 g) and water (71 g) is charged to a reactor, heated to 85° C. and degassed with nitrogen for 30 minutes. Ammonium persulfate (0.5 g) is added. A monomer feed consisting of styrene (184.8 g) and 2-ethylhexyl acrylate (151.2 g) is prepared. An initiator feed consisting of ammonium persulfate (1.5 g) and water (15.0 g) is prepared. The monomer feed is added to the reactor within 3 hours and the initiator feed is added to the reactor within 4 hours. The temperature of the reaction mixture is kept at 85° C. during polymerisation. Once the feeds are completed, the contents is held for a further 1 hour at 85° C. before being cooled to below 40° C. and Acticide® LG, a biocide containing chlorinated and non-chlorinated methyl isothiazolones, (0.9 g) is added. The obtained core shell polymer, Ciba® Glascol® LS26, consists of 70 weight parts 55/45 (w/w) styrene/2-ethylhexyl acrylate copolymer, which functions as the core polymer, and 30 weight parts 65/35 (w/w) styrene/acrylic acid, ammonium salt copolymer, which functions as the shell polymer. Ciba® Glascol® LS26 is obtained as an emulsion having a solid content of about 46% (w/w), a pH of 8.5 and a viscosity at 25° C. (Brookfield 20 rpm) of 700 mPa×s.

Example 1B

Preparation of an Acrylic Binder

To a 1 litre resin pot fitted with mechanical stirrer, condenser, nitrogen inlet, temperature probe and feed inlets was placed 98.9 g water and 483.9 g Joncryl® 8078, a solution of an ammonium salt of a low molecular weight styrene acrylic copolymer. The contents were heated to 85° C. and degassed with nitrogen for 30 minutes. A monomer phase was prepared by mixing 192.5 g styrene with 157.5 g 2-ethylhexyl acrylate. An initiator feed was prepared by dissolving 1.97 g ammonium persulfate in 63.7 g water. When the reactor was at temperature and degassed, 0.66 g ammonium persulfate was added to the reactor. After 2 minutes the monomer and initiator feeds were started appropriate to a 3 and 4 hour feed respectively. The reactor contents were maintained at 85° C. throughout the feeds. After completion of the feeds, the reactor contents were held for a further 1 hour at 85° C. before being cooled down to below 40° C. at which point 0.9 g Acticide LG, a biocide containing chlorinated and non-chlorinated methyl isothiazolones, was added. This resulted in an emulsion polymer of 49.2% solids, pH 8.3 and a Brookfield RVT viscosity of 1100 cPs.

Example 2

Ammonium sulfate (3.0 g) and D-(+)-saccharose (3.0 g) are dissolved in water (8.5 g). Ciba® Glascol® LS26 (9.5 g), prepared as described in example 1, is added and the resulting white emulsion is stirred for 2 hours. The coating composition is then applied by a 12 μm coating bar onto plain and coated paper to yield a semi transparent coating and imaged using a $CO_2$ IR laser (wavelength: 10,600 nm, power: 0.5 to 4 W, diameter of laser beam: 0.35 mm, line speed 300 to 1000 mm/s) to yield a black marking Example 3

Ammonium chloride (3.0 g) and D-(+)-saccharose (3.0 g) are dissolved in water (8.5 g). Ciba® Glascol® LS26 (9.5 g), prepared as described in example 1, is then added and the resulting white emulsion stirred for 3 hours. The coating formulation is then applied by a 12 μm coating bar onto plain and coated paper to yield an opaque coating and imaged using a $CO_2$ IR laser (wavelength: 10,600 nm, power: 0.5 to 4 W, diameter of laser beam: 0.35 mm, line speed 300 to 1000 mm/s) to yield a high contrast dark marking.

Example 4

Ammonium dihydrogen phosphate (3.0 g) and D-(+)-saccharose (3.0 g) are dissolved in water (8.5 g). Ciba® Glascol® LS26 (9.5 g), prepared as described in example 1, is then added and the resulting white suspension stirred for 2 hours. The coating formulation is then applied by a 12 μm coating bar onto plain and coated paper to yield an opaque coating and imaged using a $CO_2$ IR laser (wavelength: 10,600 nm, power:

0.5 to 4 W, diameter of laser beam: 0.35 mm, line speed 300 to 1000 mm/s) to yield a high contrast dark marking.

Example 5

A 30% by weight solution of poly(4-ammonium styrene-sulfonic acid) in water (10.0 g) and D-(+)-saccharose (3.0 g) are dissolved in of water (1.5 g) to form an orange solution. Ciba® Glascol® LE15 (4.75 g), which is a an aqueous emulsion of a carboxylated acrylic copolymer having a solid content of 60% by weight, a pH of 3 to 4 and a viscosity at 20° C. (Brookfield 20 rpm) of 200 mPa×s, is diluted by addition of water (4.75 g) and is then added slowly to this orange solution and the resulting pale orange emulsion is stirred for 1 hour. The coating formulation is then applied by a 12 μm coating bar onto plain paper, coated paper and polyethylene terephthalate film to yield a transparent coating and imaged using a $CO_2$ IR laser (wavelength: 10,600 nm, power: 0.5 to 4 W, diameter of laser beam: 0.35 mm, line speed 300 to 1000 mm/s) to yield a high contrast dark marking.

Example 6

A 30% by weight solution of poly(4-ammonium styrene-sulfonic acid) in water (10.0 g), ammonium sulfate (2.25 g) and D-(+)-saccharose (2.25 g) are dissolved in water (4.75 g) to form an orange solution. Ciba® Glascol® LE15 (4.75 g), which is a an aqueous emulsion of a carboxylated acrylic copolymer having a solid content of 60% by weight, a pH of 3 to 4 and a viscosity at 20° C. (Brookfield 20 rpm) of 200 mPa×s, is then added slowly to this orange solution and the resulting pale orange emulsion is stirred for 1 hour. The coating formulation is then applied by a 12 μm coating bar onto plain paper, coated paper and polyethylene terephthalate film to yield a transparent coating and imaged using a $CO_2$ IR laser (wave-length: 10,600 nm, power: 0.5 to 4 W, diameter of laser beam: 0.35 mm, line speed 300 to 1000 mm/s) to yield a black marking.

Example 7

A 30% by weight solution of poly(4-ammonium styrene-sulfonic acid) in water (10.0 g), ammonium sulfate (2.25 g) and glucose (2.25 g) are dissolved in water (4.75 g) to form an orange solution. Ciba® Glascol® LE15 (4.75 g), which is a an aqueous emulsion of a carboxylated acrylic copolymer having a solid content of 60% by weight, a pH of 3 to 4 and a viscosity at 20° C. (Brookfield 20 rpm) of 200 mPa×s, is then added slowly to this orange solution and the resulting pale orange emulsion is stirred for 1 hour. The coating formulation is then applied by a 12 μm coating bar onto plain paper, coated paper and polyethylene terephthalate film to yield a transparent coating and imaged using a $CO_2$ IR laser (wavelength: 10,600 nm, power: 0.5 to 4 W, diameter of laser beam: 0.35 mm, line speed 300 to 1000 mm/s) to yield a black marking.

Example 8

Ammonium sulfate (2.25 g), a 30% by weight solution of poly(4-ammonium styrene-sulfonic acid) in water (10.0 g), and D-(+)-galactose (2.25 g) are dissolved in water (4.75 g) to form an orange solution. Ciba® Glascol® LS26 (4.75 g), prepared as described in example 1, is then added slowly to this orange solution and the resulting viscous pale orange emulsion is stirred for 1 hour. The coating formulation is then applied by a 12 μm coating bar onto plain and coated paper to yield a semi-transparent coating and imaged using a $CO_2$ IR laser (wavelength: 10,600 nm, power: 0.5 to 4 W, diameter of laser beam: 0.35 mm, line speed 300 to 1000 mm/s) to yield a black marking.

Example 9

Ammonium sulfate (3.0 g) and D-(+)-Saccharose (3.0 g) are dissolved in water (8.5 g). Ciba® Glascol® C44 (9.5 g), which is a self crosslinking aqueous emulsion based on styrene acrylic copolymer having a solid content of 42% by weight, and a viscosity at 25° C. (Brookfield 20 rpm) of 200 mPa×s, is then added slowly to this solution and the resulting white emulsion is stirred for 1 hour. The coating formulation is then applied by a 12 μm coating bar onto plain and coated paper to yield a semi-transparent coating and imaged using a $CO_2$ IR laser (wavelength: 10,600 nm, power: 0.5 to 4 W, diameter of laser beam: 0.35 mm, line speed 300 to 1000 mm/s) to yield a black marking.

Example 10

Ammonium sulfate (3.0 g) and D-(+)-Saccharose (3.0 g) are dissolved in water (8.5 g). Ciba® Glascol® E11 (9.5 g), which is a polyacrylic acid based solution having a pH of 2 to 2.5 and a viscosity at 25° C. (Brookfield 20 rpm) of 2,000 to 4,000 mPa×s, is then added slowly to this solution and the resulting clear solution is stirred for 1 hour. The coating formulation is then applied by a 12 μm coating bar onto plain and coated paper to yield a semi-transparent coating and imaged using a $CO_2$ IR laser (wavelength: 10,600 nm, power: 0.5 to 4 W, diameter of laser beam: 0.35 mm, line speed 300 to 1000 mm/s) to yield a high contrast dark marking.

Example 11

A 30% by weight solution of poly(4-ammonium styrene-sulfonic acid) in water (10.0 g) and D-(+)-saccharose (3.0 g) are dissolved in water (1.5 g). The resulting orange solution is then added to a 15% by weight solution of Poval 203, which is a polyvinyl alcohol sold by Kuraray, in water (9.5 g) and the resulting viscous emulsion is stirred for 1 hour. The coating formulation is then applied by a 12 μm coating bar onto plain or coated paper to yield a semi-transparent coating and imaged using a $CO_2$ IR laser (wavelength: 10,600 nm, power: 0.5 to 4 W, diameter of laser beam: 0.35 mm, line speed 300 to 1000 mm/s) to yield a high contrast dark marking.

Example 12

Ammonium sulfate (10.0 g) and D-(+)-saccharose (16.0 g) are dissolved in water (24.0 g). Ciba® Glascol® LS26 (46.0 g), prepared as described in example 1, is then added and the resulting white emulsion stirred for 2 hours. The coating formulation is then applied by a 12 μm coating bar onto plain, coated and coloured paper to yield a semi-transparent coating which does not effect the shade of the coloured paper and imaged using a $CO_2$ IR laser (wavelength: 10,600 nm, power: 0.5 to 4 W, diameter of laser beam: 0.35 mm, line speed 300 to 1000 mm/s) to yield a black marking.

Example 13

Ammonium sulfate (3.0 g) is dissolved in water (11.5 g). Ciba® Glascol® LS26 (9.5 g), prepared as described in example 1, is then slowly added and the resulting white emulsion stirred for 30 minutes. The coating formulation is then applied by a 12 μm coating bar onto plain and coated paper to yield a semi-transparent coating and imaged using a $CO_2$ IR laser (wavelength: 10,600 nm, power: 0.5 to 4 W, diameter of laser beam: 0.35 mm, line speed 300 to 1000 mm/s) to yield a high contrast, dark marking.

Examples 14 to 47

The compositions of examples 14 to 47 are listed in table 1 below. The compositions are filled up with water to a total weight of 100 g. The amount of Glascol® LS 26 and the binder of example 1B refer to the amount of the emulsion, which has a solid content of 46%, respectively, 49% by weight. The amount of the additional component refers to the dry weight of the additional component.

TABLE 1

| Example No | Latent activator | Char forming compound | binder | Additional component | pH |
|---|---|---|---|---|---|
| 14 | Ammonium sulfate 7 g | Saccharose[1] 15 g | Ciba ® Glascol ® LS26 40 g | NaOH | 9.5 |
| 15 | Ammonium sulfate 5 g | Saccharose[1] 15 g | Polyvinyl alcohol 5 g | — | 5.4 |
| 16 | Ammonium sulfate 5 g | Saccharose[1] 15 g | Polyvinyl alcohol 5 g | 25% by weight aqueous $NH_3$ | 8.1 |
| 17 | Ammonium benzene sulfonic acid 11 g | Saccharose[1] 15 g | Example 1B 40 g | — | 7.96 |
| 18 | Ammonium methane sulfonic acid 12 g | Saccharose[1] 15 g | Example 1B 40 g | — | 8.37 |
| 19 | Ammonium sulfite 7 g | Saccharose[1] 15 g | Example 1B 40 g | — | 7.82 |
| 20 | Ammonium sulfate 7 g | Saccharose[1] 15 g | Ciba ® Glascol ® LS26 40 g | $Al_2O_3$ 7 g | 7.76 |
| 21 | Ammonium sulfate 7 g | Saccharose[1] 15 g | Ciba ® Glascol ® LS26 40 g | $Al(OH)_3$ 7 g | 7.79 |
| 22 | Diammonium hydrogen phosphate 7 g | Saccharose[1] 15 g | Ciba ® Glascol ® LS26 40 g | — | 7.9 |
| 23 | Diammonium hydrogen phosphate 7 g | Saccharose[1] 15 g | Ciba ® Glascol ® LS26 40 g | 25% by weight aqueous $NH_3$ | 9.5 |
| 24 | Diammonium hydrogen phosphate 4 g | Saccharose[1] 15 g | Ciba ® Glascol ® LS26 40 g | 25% by weight aqueous $NH_3$ | 7.7 |
| 25 | Diammonium hydrogen phosphate 12 g | Saccharose[1] 15 g | Ciba ® Glascol ® LS26 40 g | 25% by weight aqueous $NH_3$ | 7.7 |
| 26 | Ammonium polyphosphate 7 g | Saccharose[1] 15 g | Ciba ® Glascol ® LS26 40 g | 25% by weight aqueous $NH_3$ | 7.6 |
| 27 | Phytic acid, dodecaammonium salt 10.4 g | Saccharose[1] 15 g | Example 1B 40 g | 25% by weight aqueous $NH_3$ | 7.75 |
| 28 | Phytic acid, dodecaammonium salt 10.4 g | — | Example 1B 40 g | 25% by weight aqueous $NH_3$ | 7.7 |
| 29 | 2-Aminoethyl ammoniumhydrogen phosphate 11 g | Saccharose[1] 15 g | Example 1B 40 g | — | 8.67 |
| 30 | Phosphorous acid, diammonium salt 9.9 g | Saccharose[1] 15 g | Example 1B 40 g | — | 8.19 |
| 31 | Nitrilotris(methylene triphosphonic acid), pentaammonium salt 12.7 g | Saccharose[1] 15 g | Example 1B 40 g | — | 7 |
| 32 | 1-hydroxyethylidene diphosphonic acid, diammonium salt 12 g | Saccharose[1] 15 g | Example 1B 40 g | 25% by weight aqueous $NH_3$ | 7.6 |
| 33 | Phenylphosphonic acid, diammonium salt 12.1 g | Saccharose[1] 15 g | Example 1B 40 g | — | 8.52 |
| 34 | Methanephosphonic acid, ammonium salt 12.1 g | Saccharose[1] 15 g | Example 1B 40 g | 25% by weight aqueous $NH_3$ | 8.24 |
| 35 | Phenylphosphinic acid, ammonium salt 11 g | Saccharose[1] 15 g | Example 1B 40 g | — | 9.3 |
| 36 | Ammonium sulfate 7 g | Saccharose[1] 15 g | Ciba ® Glascol ® LS26 40 g | Colloidal $SiO_2$[2] 7 g | 8.24 |

TABLE 1-continued

| Example No | Latent activator | Char forming compound | binder | Additional component | pH |
|---|---|---|---|---|---|
| 37 | Ammonium sulfate 7 g | Saccharose[1] 15 g | Ciba ® Glascol ® LS26 20 g | Colloidal SiO$_2$[2] 17.4 g | 8.4 |
| 38 | Ammonium sulfate 10 g | Saccharose[1] 15 g | Ciba ® Glascol ® LS26 40 g | White talc 7 g | 7.58 |
| 39 | Ammonium sulfate 10 g | Saccharose[1] 15 g | Ciba ® Glascol ® LS26 40 g | Kaolin 7 g | 7.7 |
| 40 | Ammonium sulfate 7 g | Saccharose[1] 15 g | Example 1B 40 g | Aluminum silicate 7 g | 7.35 |
| 41 | Ammonium sulfate 7 g | Saccharose[1] 15 g | Example 1B 40 g | Antimony(V) oxide doped mica[3] 5 g | 7.36 |
| 42 | Ammonium sulfate 7 g | Saccharose[1] 15 g | Example 1B 40 g | Tin(IV)oxide doped mica[4] 5 g | 9.6 |
| 43 | Tartaric acid, diammonium salt 12 g | Saccharose[1] 15 g | Example 1B 40 g | 25% by weight aqueous NH$_3$ | 7.94 |
| 44 | Ammonium sulfate 7 g | Saccharose[1] 15 g | Ciba ® Glascol ® LS26 40 g | Ciba ® Microsol ® Black 2-B 0.05 g | 7.84 |
| 45 | Ammonium sulfate 7 g | Saccharose[1] 15 g | Ciba ® Glascol ® LS26 40 g | Ciba ® Microsol ® Black C-E2 0.05 g | 7.9 |
| 46 | Ammonium thiosulfate 7 g | Saccharose[1] 15 g | Example 1B 40 g | — | 7.58 |
| 47 | Tris(hydroxymethyl) ammoniummethane ammonium hydrogen phosphate 7.5 g | Saccharose[1] 15 g | Example 1B 40 g | 25% by weight aqueous NH$_3$ | 7.55 |

[1] Saccharose means D-(+)-saccharose.
[2] Sold under the tradename Ludox ® AS30.
[3] Sold under the trade name Lazerflair ® 825.
[4] Sold under the trade name Ciba ® Xymara ® Silver Pearl S20.

The compositions of examples 14, 15, 16 17 and 18 yield high contrast, dark marks when coated on paper and imaged using a $CO_2$ IR laser (wavelength: 10,600 nm, power: 0.5 to 4 W, diameter of laser beam: 0.35 mm, line speed 300 to 1000 mm/s).

The compositions of examples 19, 20, 21, 23, 24, 25, 22, 26, 27, 29, 33, 34, 36, 37, 38, 39, 40 and 41 yield high contrast, dark marks when coated either on paper or on polyester film and imaged using a $CO_2$ IR laser (wavelength: 10,600 nm, power: 0.5 to 4 W, diameter of laser beam: 0.35 mm, line speed 300 to 1000 mm/s).

The compositions of examples 28, 30, 31, 32, 35, 42, 43, 44, 45, 46 and 47 yield high contrast, dark marks when coated on polyester film and imaged using a $CO_2$ IR laser (wavelength: 10,600 nm, power: 0.5 to 4 W, diameter of laser beam: 0.35 mm, line speed 300 to 1000 mm/s).

The invention claimed is:

1. A coating composition comprising a latent activator, wherein the latent activator is a salt of an acid and an amine, wherein the amine is of formula $NR^1R^2R^3$, wherein $R^1$, $R^2$ and $R^3$ can be the same or different and are hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, or $R^1$ is hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl and $R^2$ and $R^3$, together with the nitrogen of the amine of formula $NR^1R^2R^3$ form a 5- to 7-membered ring, whereby $C_{1-30}$-alkyl, $C_{2-30}$-alkenyl, $C_{4-8}$-cycloalkyl, $C_{5-8}$-cycloalkenyl, aralkyl and aralkenyl can be unsubstituted or substituted with $NR^4R^5R^6$, imino, cyano, cyanamino, hydroxy and/or $C_{1-6}$-alkoxy, and aryl can be unsubstituted or substituted with $NR^4R^5R^6$, cyano, cyanamino, hydroxyl, $C_{1-6}$-alkyl, and/or $C_{1-4}$-alkoxy, wherein $R^4$, $R^5$ and $R^6$ can be the same or different and are hydrogen, $C_{1-6}$-alkyl, $C_{4-8}$-cycloalkyl or aryl, and
wherein the coating composition does not contain a dye or colour former.

2. The coating composition of claim 1, wherein the acid is selected from the group consisting of inorganic acids, sulfur-based organic acids, phosphor-based organic acids, carboxylic acids and mixtures thereof.

3. The coating composition of claim 1, wherein the acid derivative is an ester, amide, anhydride or thioester of the acid as defined in claim 2, wherein all acidic OH-groups are substituted with $OR^7$, $NR^8R^9$, $OC(O)R^{10}$ or $SR^{11}$, whereby $R^7$, $R^8$, $R^9$, $R^{10}$ and $R^{11}$ are the same or different and can be hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, whereby $C_{1-30}$-alkyl, $C_{2-30}$-alkenyl, $C_{4-8}$-cycloalkyl, $C_{5-8}$-cycloalkenyl, aralkyl and aralkenyl can be unsubstituted or substituted with $NR^{12}R^{13}R^{14}$, halogen, cyano, hydroxy and/or $C_{1-6}$-alkoxy, and aryl can be unsubstituted or substituted with $NR^{12}R^{13}R^{14}$, halogen, cyano, hydroxyl, $C_{1-6}$-alkyl, and/or $C_{1-6}$-alkoxy, whereby $R^{12}$, $R^{13}$ and $R^{14}$ can be the same or different and are hydrogen, $C_{1-6}$-alkyl, $C_{4-8}$-cycloalkyl or aryl, provided that $R^7$ is not hydrogen.

4. The coating composition of claim 1, wherein the composition also comprises a solvent.

5. The coating composition of claim 1, wherein the composition also comprises a polymeric binder.

6. The coating composition of claim 1, wherein the composition also comprises a char forming compound.

7. The coating composition of claim 6, wherein the char forming compound is selected from the group consisting of carbohydrates and derivatives thereof wherein the carbonyl group has been reduced to a hydroxyl group.

8. The coating composition of claim 1, wherein the composition also comprises additional components.

9. A process for preparing the coating composition of claim 1, comprising mixing a latent activator and a solvent.

10. A substrate coated with the coating composition of claim 1.

11. A process for preparing a coated substrate, comprising the step of coating a substrate with the composition of claim 1.

12. A process for preparing a marked substrate, comprising the steps of
  i) coating a substrate with the composition of claim 1, and
  ii) exposing those parts of the coated substrate, where a marking is intended, to energy in order to generate a marking.

13. The process of claim 12 wherein the energy is selected from the group consisting of UV, IR, visible and microwave irradiation.

14. The process of claim 13, wherein the energy is IR irradiation.

15. A marked substrate, which is obtained by the process of claim 12.

* * * * *